H. WATKINS.
SAW SETTING MACHINE.
APPLICATION FILED JULY 10, 1907.
937,902.
Patented Oct. 26, 1909.
2 SHEETS—SHEET 1.
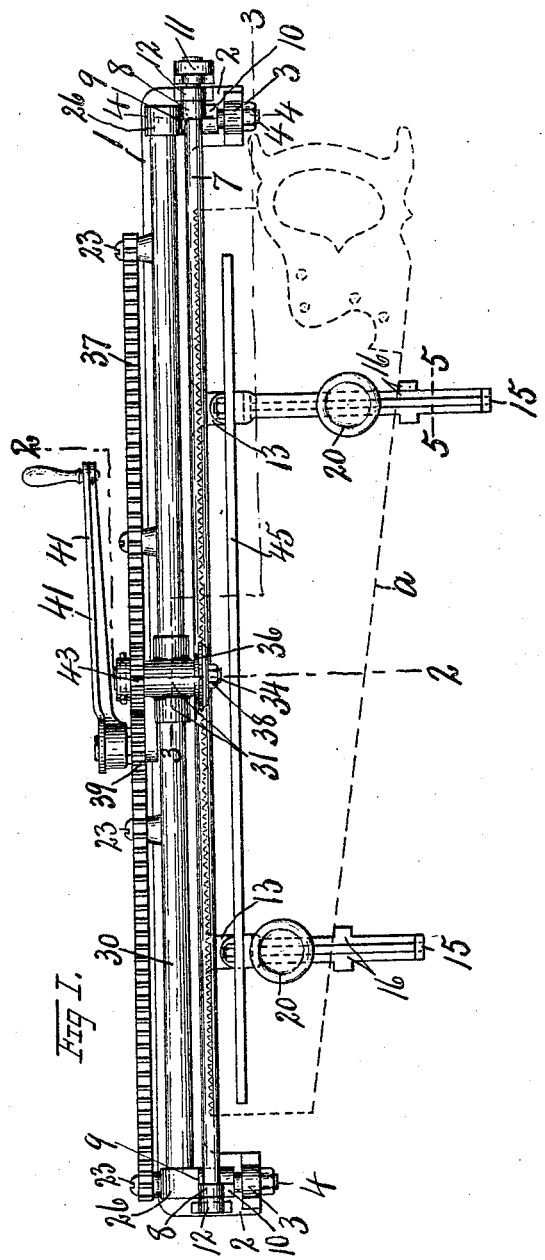
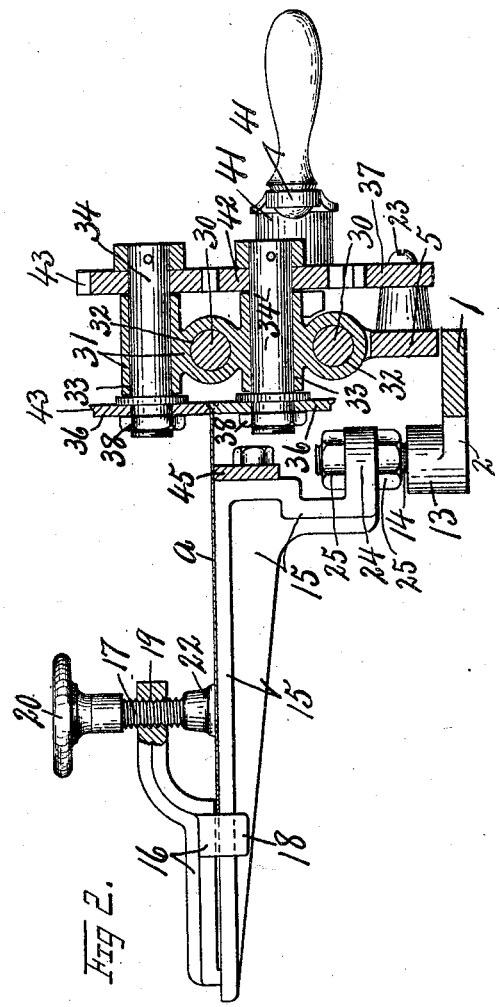
Witnesses:
F. E. Arthur
H. E. Chase
Inventor.
Harry Watkins
By
Howard P. Denison
Attorney.

H. WATKINS.
SAW SETTING MACHINE.
APPLICATION FILED JULY 10, 1907.
937,902.
Patented Oct. 26, 1909.
2 SHEETS—SHEET 2.
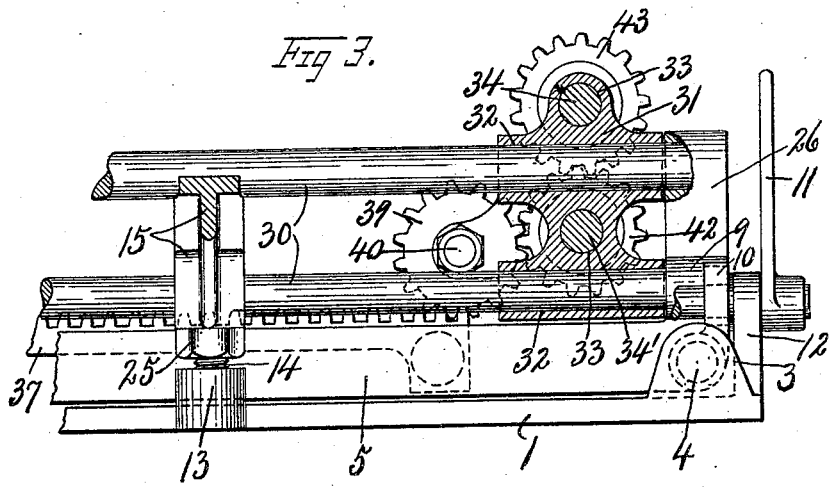
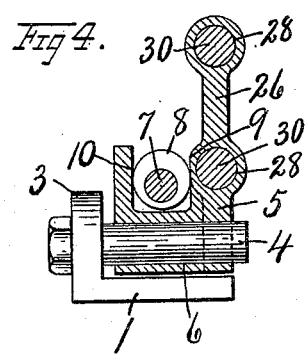
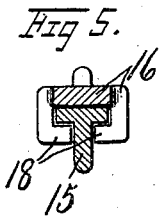
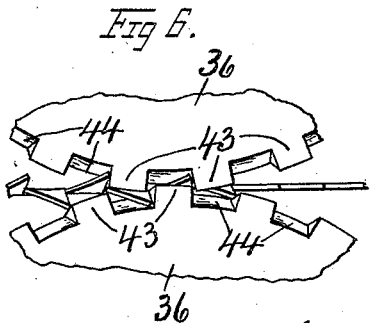
Witnesses:
F. E. Arthur
H. E. Chase
Inventor:
Harry Watkins
By
Howard P. Denison
Attorney.

UNITED STATES PATENT OFFICE.

HARRY WATKINS, OF UTICA, NEW YORK, ASSIGNOR OF ONE-HALF TO DELOS DE WOLF SMYTH, OF UTICA, NEW YORK.

SAW-SETTING MACHINE.

937,902.  Specification of Letters Patent.  Patented Oct. 26, 1909.

Application filed July 10, 1907. Serial No. 382,990.

*To all whom it may concern:*

Be it known that I, HARRY WATKINS, of Utica, in the county of Oneida, in the State of New York, have invented new and useful Improvements in Saw-Setting Machines, of which the following, taken in connection with the accompanying drawings, is a full, clear, and exact description.

This invention relates to certain improvements in saw setting machines and is specifically adapted for setting the teeth of hand-saws. The blades of these saws are usually tapered as distinguished from band saws, scroll saws and hack saws in which the opposite longitudinal edges are substantially parallel and, therefore, may be fed relatively to the saw setting disks as shown in patent to Watkins and Dye No. 839,909 issued January 1, 1907, also in my pending application No. 328,039, filed July 27, 1906, while in my present application, the taper of the blade makes it necessary to hold it in a fixed position and move the saw setting disk relatively thereto.

It is well known that the teeth intermediate the ends of the saw wear away faster than those at the ends and that after a longer or shorter period of use the longitudinal cutting edge becomes concave or deflected from a straight line and while the main object of my invention is to provide a simple device for setting the teeth of taper saws (particularly hand-saws) I have also sought to provide means whereby the saw setting disks may be shifted transversely of the saw blade simultaneously with its longitudinal movement so as to follow any deflections of the saw teeth from a straight line.

Another object is to provide vertically adjustable saw rests to which the saw is adapted to be clamped and by which the saw teeth may be brought into proper registration with the meeting faces of the saw setting disks.

Other objects and uses will be brought out in the following description.

In the drawings—Figure 1 is a top plan of a saw setting machine embodying the various features of my invention. Figs. 2, 3, 4, and 5 are sectional views taken respectively on lines 2—2, 3—3, 4—4, and 5—5, Fig. 1, the cam shaft being omitted in Fig. 2. Fig. 6 is an enlarged elevation of adjacent portions of a saw setting disk.

In carrying out the objects stated, I provide a main supporting frame consisting in this instance of a horizontal bar —1— of suitable metal adapted to be secured to any available support and provided at its opposite ends with laterally projecting arm —2— having upturned apertured ears —3— in which are secured transverse studs —4— for supporting a transversely movable frame —5—. As best shown in Fig. 4, this frame —5— is provided near its ends with transverse apertures —6— receiving the lugs or spindles —4— and permitting the frame —5— to be moved transversely thereon for a purpose hereinafter described. This transverse shifting movement of the frame —5— upon the studs —4— is effected by means of a rock-shaft —7— and one or more eccentrics —8— which play between opposed bearings —9— and —10— on the frame —5—, the rock shaft —7— being provided at one end with a hand-lever —11— whereby it may be manipulated or rocked in either direction to bring the saw setting disks, which are mounted on the frame —5—, into proper registration and engagement with the teeth of the saw.

The ends of the shaft —7— are journaled in suitable bearings —12— on the ends of the main supporting frame —1— and the eccentrics —8— are secured thereto just inside of the bearings —12— and between the bearings —9— and —10— on the frame —5— which is nearly coextensive in length with the frame —1—. This frame —1— is provided with intermediate laterally projecting hubs or posts —13— spaced some distance apart from each other and from the upright threaded arms —2—, and support upright threaded studs —14—. Each of these studs —14— receives and supports a horizontal arm or saw rest —15— having its upper face disposed in a substantially horizontal plane and is made T-shape in cross section forming a transverse guide for a movable saw-stop or abutment —16— which also carries a saw clamp or screw —17—.

The sliding heads —16— of which there are two, one for each of the arms —15— is formed with lugs —18— underhanging the ways —15— and adapted to be slipped on and off over the outer ends of said ways when desired.

The clamp —17— is engaged with a threaded aperture —19— in the sliding head —16— and is provided with a suitable hand-piece —20— whereby the lower end of the clamp, which is provided with the usual swivel block —22—, may be brought into holding engagement with the saw blade as —a—.

The arm —15— is provided with a downwardly and rearwardly projecting apertured lug —24— slidable vertically on the screw —14— and rigidly held in its adjusted position by suitable nuts —25— on the screw —14— and engaging respectively the upper and lower faces of the lug —24—.

The frame —5— is provided at its opposite ends with upright standards —26— having apertures —27— and —28— arranged in planes one above the other and in which is secured a pair of lengthwise guide rods —30—, for supporting and guiding a sliding head or carriage —31—. This carriage is, therefore, provided with a pair of lengthwise apertures —32— for the guide rods —30— and is also provided with transverse apertures —33— in which are journaled rotary spindles —34— and —34'— carrying similar but opposed saw-setting disks —36— having their meeting faces disposed in substantially the same horizontal plane as the upper face of the arms —15—, said disks being rigidly clamped to their respective shafts by nuts —38—.

It is now clear that the frame —5— is movable transversely of and relatively to the fixed frame —1— but is held from endwise movement by being interposed between the upturned lugs or ears —12— or rather by being mounted upon the transverse studs or pins —4— which are rigid on the frame —1—.

Secured to the back of the transversely movable frame —5— by suitable fastening means as screws —23— is a lengthwise toothed rack —37— and upon the sliding head or carriage —31— is revolubly mounted a toothed idler or gear —39—, the latter being loosely journaled upon a stud —40— and is provided with a crank-arm —41—, Figs. 1 and 2, by which it may be rotated.

The toothed rack —37— is nearly coextensive with the length of the frame —5— upon which it is mounted and together with the sliding head or carriage —31— is movable transversely of the frame —2— by means of the rock-shaft —7—, eccentrics —8— and hand-piece —11—.

It is now obvious that by rotating the pinion or idler —39—, it, together with the carriage —31—, will be moved bodily backward and forward along the rack —37— and guide rods —30— thereby rotating the saw setting disks —36— in engagement with the teeth of the saw —a— shown by dotted lines in Fig. 1 and by full lines in section in Fig. 2, it being understood that the idler —39— meshes with the lower gear as —42— which is secured to the shaft —35— and meshes with a similar gear —43— on the upper shaft —34—.

The saw setting disks —36— which are secured to the shafts —34— and —35— are, therefore, positively driven at the same rate of speed and are provided with beveled saw setting teeth —43'— and intervening spaces —44— which intermesh with each other at their meeting faces to set alternate teeth of the saw in opposite directions as best shown in Fig. 6.

The inner or rear ends of the arms —15— are connected by a bar —45— which serves the double purpose of holding the arms —15— parallel against rotation about their supporting studs —14— and also affords additional support for the saw nearly its entire length and close to the meeting faces of the disks —36—, the upper face of said bar being coincident with the top faces of the arms —15— and, therefore, in a horizontal plane coincident with the meeting faces of said disks.

In operation, the sliding head —31— and parts carried thereby are drawn back to one extreme end of its guide rods —30—, as shown in Fig. —3— bringing the saw setting disks —36— beyond the ends of the saw blade whereupon the saw as —a— is laid flatwise upon the supporting arms —15— and bar —45— and the latter adjusted by means of the nuts —25— to bring the saw in a horizontal plane coincident with the meeting edges of the disks —36—. In this position, the idler —39— is rotated by the crank —41— thereby causing the idler and sliding head —31— to travel lengthwise of the saw along the rack —37— and guide rods —30— and at the same time rotating the disks —36— along the teeth of the saw causing the teeth —43'— of the disks —36— to engage and set alternate saw teeth in opposite directions. Previous to the operation of setting the teeth, however, the heads —16— are adjusted to bring the lugs —18— against the back edge of the saw after the cutting edge of said saw has been brought into proper alinement with the meeting faces of the disks after which the clamps —17— are tightened to hold the saw in place.

When the cutting edge of the saw is straight, it is simply necessary to move the carriage —31— back and forth from one extreme to the other to give the desired set to the saw teeth. If, however, the parts of the cutting edge of the saw are worn or deflected from a straight line, the saw setting disks may be made to follow such line by proper manipulation of the cams —8— through the medium of the crank-arm —11— and rock-shaft —7— by which operation the frame —5— may be moved transversely upon the guide —4—. It is also evident that by means of this adjustment the saw setting disks may be wedged up more firmly against the teeth of the saw in the original adjustment and it also compensates for any slight variation in the alinement of the cutting edge of the saw out of parallel with the rack —37—.

What I claim is:

1. In a saw setting machine, a reciprocatory carriage, means for guiding the carriage, means for moving the carriage along the guide, a pair of rotary disks mounted on the carriage and having intermeshing saw setting teeth adapted to engage opposite sides of the teeth of the saw, means for holding the saw in the plane of the meeting edges of the disks, and means for registering the teeth of the saw with those of the disks.

2. In a saw setting machine, a reciprocatory carriage and guide therefor, means for reciprocating the carriage along the guide, a pair of rotary saw setting disks mounted on the carriage, means actuated by the first named means for rotating said disks, a support for the saw, and means for adjusting the support to bring the saw in the plane of the meeting edges of said disk.

3. In a saw setting machine, a main supporting frame, a saw rest mounted on said frame, a carriage supporting frame, a carriage mounted on the supporting frame and movable lengthwise thereof, means for reciprocating the carriage along the supporting frame, separate means for moving the carriage transversely of the main frame, saw setting disks journaled on the carriage, and means for rotating said disks.

4. In a saw setting machine, a reciprocatory carriage, and driving means therefor, a supporting frame along which the carriage is movable, said supporting frame being movable transversely of the reciprocatory movement of the carriage, rotary saw setting disks mounted on the carriage and having their peripheries traveling in close proximity to each other, a saw support having a bearing face for the saw disposed in the plane of the meeting edges of the disk, and means for adjusting the saw support transversely of said plane.

5. In a saw setting machine, a main supporting frame, a second frame mounted upon and movable transversely of the main frame, a carriage mounted upon and movable lengthwise of the second frame, a toothed rack mounted upon and extending lengthwise of the second frame, a rotary pinion mounted on the carriage and meshing with said rack, means for rotating the pinion whereby the carriage is moved lengthwise of the second frame and rack, rotary saw setting disks on the carriage, means for transmitting motion from the pinion to the saw setting disks as the carriage is moved along the second frame, and means for holding the saw in position to have its teeth engaged by the saw setting disks, and additional means for moving the second frame and carriage mounted thereon transversely of the main frame.

In witness whereof I have hereunto set my hand this 2nd day of July 1907.

HARRY WATKINS.

Witnesses:
MILDRED M. NOTT,
C. M. McCORMACK.